(12) United States Patent  (10) Patent No.: US 7,812,864 B2
Kuboi  (45) Date of Patent: Oct. 12, 2010

(54) RED EYE IMAGE CORRECTION DEVICE, ELECTRONIC CAMERA AND RED EYE IMAGE CORRECTION PROGRAM PRODUCT

(75) Inventor: Motoyuki Kuboi, Yokohama (JP)

(73) Assignee: Nikon Corporation, Tokyo (JP)

( * ) Notice: Subject to any disclaimer, the term of this patent is extended or adjusted under 35 U.S.C. 154(b) by 171 days.

(21) Appl. No.: 12/149,433

(22) Filed: May 1, 2008

(65) Prior Publication Data

US 2008/0211938 A1 Sep. 4, 2008

Related U.S. Application Data

(63) Continuation of application No. 11/049,731, filed on Feb. 4, 2005, now abandoned.

(30) Foreign Application Priority Data

Feb. 9, 2004 (JP) .............................. 2004-032452

(51) Int. Cl.
    *H04N 5/262* (2006.01)
(52) U.S. Cl. .................................. 348/239; 348/222.1
(58) Field of Classification Search .............. 348/222.1, 348/239, 321.99, 370; 382/167
    See application file for complete search history.

(56) References Cited

U.S. PATENT DOCUMENTS 7,289,664 B2  10/2007  Enomoto

2004/0196503 A1  10/2004  Kurtenbach et al.
2004/0233301 A1  11/2004  Nakata et al.
2004/0257456 A1  12/2004  Goris et al.
2005/0047656 A1   3/2005  Luo et al.
2005/0062856 A1   3/2005  Matsushita

FOREIGN PATENT DOCUMENTS

| JP | A-06-350914 | 12/1994 |
| JP | A-2000-299812 | 10/2000 |
| JP | A-2000-305141 | 11/2000 |
| JP | A-2001-148780 | 5/2001 |
| JP | A-2003-109008 | 4/2003 |
| JP | A-2003-179807 | 6/2003 |
| JP | A-2005-167697 | 6/2005 |

OTHER PUBLICATIONS

U.S. Appl. No. 11/703,242, filed Feb. 7, 2007, Masaki Hayashi.
Jul. 12, 2010 Office Action issued in U.S. Appl. No. 11/703,242.

*Primary Examiner*—Gevell Selby
(74) *Attorney, Agent, or Firm*—Oliff & Berridge, PLC

(57) ABSTRACT

A red eye image correction device includes: a data size conversion unit that executes reduction processing on an image so as to retain color component information contained in the image and generates a sub image with a smaller data size than the image; a red eye detection unit that detects data corresponding to red eye portions in data constituting the sub image; a position information calculation unit that obtains through calculation second position information indicating positions of data corresponding to the red eye portions in data constituting the image by using first position information indicating positions of the detected data in the sub image data; and a red eye correction unit that executes red eye correction processing on the data of the image indicated by the second position information.

12 Claims, 4 Drawing Sheets

FIG.4

RED EYE IMAGE CORRECTION DEVICE, ELECTRONIC CAMERA AND RED EYE IMAGE CORRECTION PROGRAM PRODUCT

This application is a continuation of U.S. patent application Ser. No. 11/049,731, filed Feb. 4, 2005, the entire contents of which are hereby incorporated by reference.

INCORPORATION BY REFERENCE

The disclosures of the following priority application and publication are herein incorporated by reference:

Japanese Patent Application No. 2004-032452 filed Feb. 9, 2004

Japanese Laid Open Patent Publication No. H 6-350914

BACKGROUND OF THE INVENTION

1. Field of the Invention

The present invention relates to a device that corrects a red eye image contained in an image photographed by using an electronic flash unit.

2. Description of Related Art

There is a technology known in the related art that is adopted to correct the "red eye phenomenon" manifesting in an image (see Japanese Laid Open Patent Publication No. H 6-350914). The "red eye phenomenon", in which the pupils in the eyes of people and the like are rendered in red color in images photographed by using an electronic flash unit, is caused as the illuminating light emitted from the electronic flash device is reflected from within the eyeballs. Japanese Laid Open Patent Publication No. H 6-350914 discloses a technology whereby the red eye data portion is extracted from the digital image data read from the raw data and the extracted red eye data portion is corrected to a normal pupil color. A problem with the method, in which the red eye data portion is extracted from the entire image data, is that when the data size of the image data is large, the red eye portion extraction processing takes a long time. Japanese Laid Open Patent Publication No. 2000-299812 discloses an electronic camera that executes photographing operations by using an electronic flash unit and without using the electronic flash unit, extracts the red eye data portion in the image by calculating the correlation between the images obtained through the individual photographing operations and executes red eye correction processing on the extracted red eye data portion.

SUMMARY OF THE INVENTION

The technology disclosed in Japanese Laid Open Patent Publication No. 2000-299812 requires two photographed images to enable the red eye correction processing for a single photographed image.

According to the 1st aspect of the invention, a red eye image correction device comprises: a data size conversion unit that executes reduction processing on an image so as to retain color component information contained in the image and generates a sub image with a smaller data size than the image; a red eye detection unit that detects data corresponding to red eye portions in data constituting the sub image; a position information calculation unit that obtains through calculation second position information indicating positions of data corresponding to the red eye portions in data constituting the image by using first position information indicating positions of the detected data in the sub image data; and a red eye correction unit that executes red eye correction processing on the data of the image indicated by the second position information.

According to the 2nd aspect of the invention, in the red eye image correction device according to the 1st aspect it is preferred that the data size conversion unit generates the sub image if the data size of the image is equal to or greater than a predetermined value.

According to the 3rd aspect of the invention, in the red eye image correction device according to the 1st or 2nd aspect, it is preferred that there is further provided a process regulating unit that interrupts detection processing by the red eye detection unit, calculation processing by the position information calculation unit or the red eye correction processing by the red eye correction unit if the processing has been executed over a length of time exceeding a predetermined time length and proceeds to execute processing other than the detection processing, the calculation processing and the red eye correction processing.

According to the 4th aspect of the invention, in the red eye image correction device according to the 3rd aspect, it is preferred that there is further provided a data recording unit that records data indicating incomplete red eye correction in correlation with the data of the image if the processing is interrupted by the process regulating unit.

According to the 5th aspect of the invention, in the red eye image correction device according to the 4th aspect, it is preferred that the data size conversion unit generates the sub image in correspondence to an image correlated with the data indicating incomplete red eye correction.

According to the 6th aspect of the invention, an electronic camera comprises: a red eye image correction device according to any of the 1st through 5th aspect; an image-capturing unit that captures a subject image and generates image data that include a color component; a light emission instruction unit that outputs a light emission instruction signal to an electronic flash unit which illuminates a subject during a photographing operation; and a recording unit that records the data constituting the image into a recording medium.

According to the 7th aspect of the invention, an electronic camera comprises: an image-capturing unit that captures a subject image and generates image data; a sub image generation unit that executes reduction processing on the image data to generate a sub image data with a smaller data size than the image data; a red eye detection unit that executes detection processing to detect red eye portions in the sub image data; a position information calculation unit that executes calculation processing to obtain second position information indicating positions of red eye portions in the image data by using first position information indicating positions of the detected red eye portions in the sub image data; a red eye correction unit that executes red eye correction processing on the image data based upon the second position information; and a recording unit that records the image data having undergone the red eye correction processing into a recording medium.

According to the 8th aspect of the invention, in the electronic camera according to the 7th aspect, it is preferred that: if at least one of the detection processing by the red eye detection unit, the calculation processing by the position information calculation unit and the red eye correction processing by the red eye correction unit has been executed over a length of time exceeding a predetermined time length, the red eye correction unit does not execute the red eye correction processing on the image data; and the recording unit records the image data having not undergone the red eye correction processing with information indicating that the red eye correction processing has not undergone, into the recording medium.

According to the 9th aspect of the invention, in the electronic camera according to the 8th aspect, it is preferred that there is further provided: an image obtaining unit that obtains the image data recorded in the recording medium; and a control unit that controls the reduction processing by the sub image generation unit, the detection processing by the red eye detection unit, the calculation processing by the position information calculation unit and the red eye correction processing by the red eye correction unit to be executed on the obtained image, when the obtained image data includes the information indicating that the red eye correction processing has not undergone.

According to the 10th aspect of the invention, in the electronic camera according to the 9th aspect, it is preferred that the recording unit records the obtained image data having undergone the red eye correction processing into the recording medium.

According to the 11th aspect of the invention, a computer-readable computer program product contains a red eye image correction program. The red eye image correction program comprises: an instruction code for executing reduction processing on an image so as to retain color component information contained in the image and generating a sub image with a smaller data size than the image; an instruction code for detecting data corresponding to red eye portions in data constituting the sub image; an instruction code for obtaining through calculation second position information indicating positions of data corresponding to the red eye portions in data constituting the image by using first position information indicating positions of the detected data in the sub image data; and an instruction code for executing red eye correction on the data of the image indicated by the second position information.

DESCRIPTION OF PREFERRED EMBODIMENT

Figure 1:
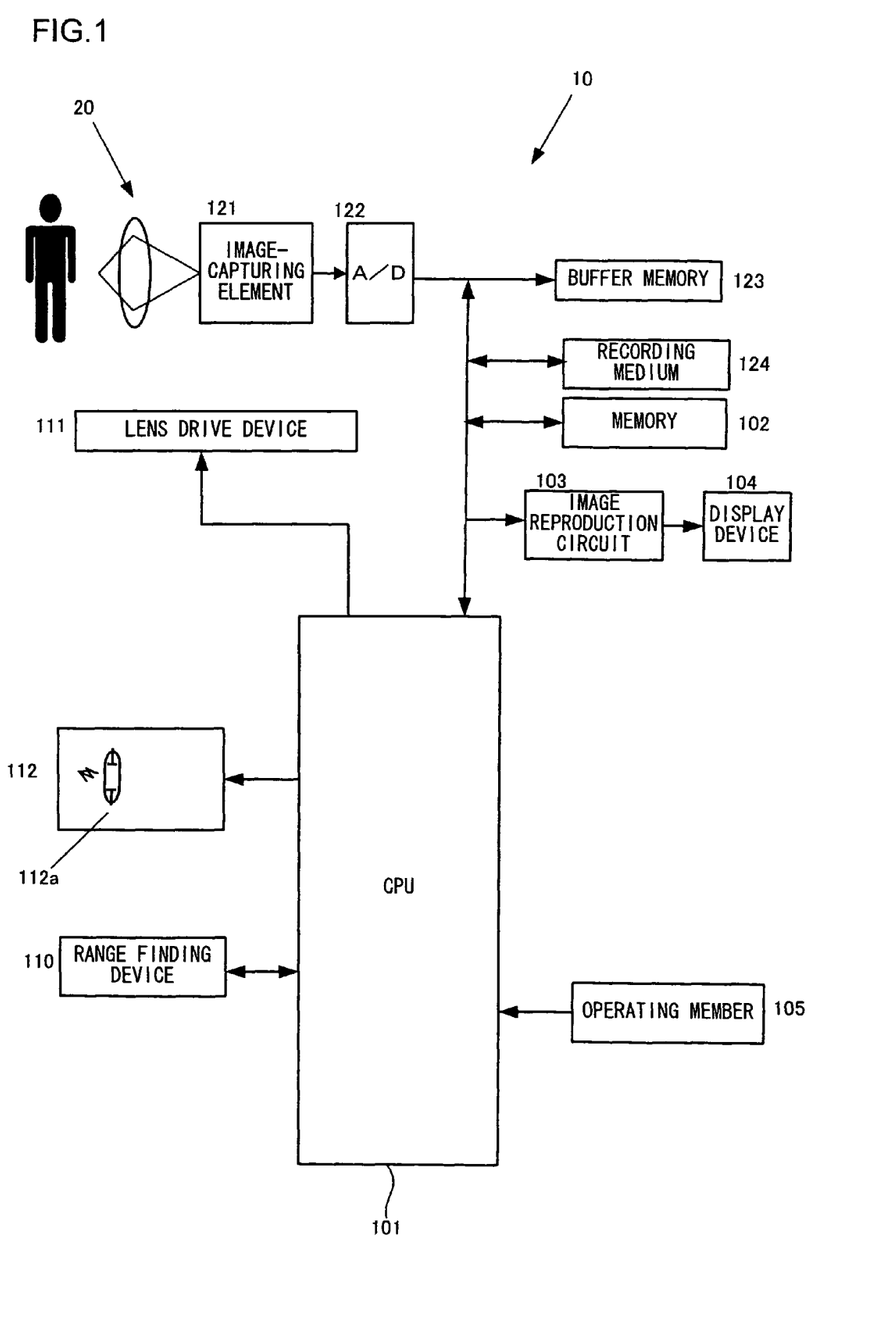
FIG. 1 is a block diagram showing the essential structure adopted in the electronic camera achieved in an embodiment of the present invention.

The following is an explanation of a preferred embodiment of the present invention, given in reference to the drawings. FIG. 1 is a block diagram of the essential structure adopted in an electronic camera 10 achieved in an embodiment of the present invention. A CPU 101 in FIG. 1 is constituted with a microcomputer and the like. The CPU 101 executes specific arithmetic operations by using signals input thereto from various blocks to be detailed later and outputs control signals generated based upon the arithmetic operation results to the individual blocks.

An image-capturing element 121 is constituted with a CCD image sensor or the like. The image-capturing element 121 captures an image formed with a subject light flux having passed through a photographic lens 20 and outputs image-capturing signals to an A/D conversion circuit 122. The A/D conversion circuit 122 converts the analog image-capturing signals to digital signals.

In a buffer memory 123, image data resulting from the digital conversion are temporarily stored. In addition to executing image processing such as white balance processing on the digitized image data, the CPU 101 executes compression processing for compressing the image data having undergone the image processing in a specific format, decompression processing for decompressing compressed image data and the like. The buffer memory 123 is utilized to temporarily store data to undergo the image processing, data currently undergoing the image processing and data having undergone the image processing.

A recording medium 124 is constituted with a memory card or the like that can be detachably loaded in an electronic camera main unit 10. Image data to be saved are recorded into the recording medium 124.

A memory 102 is utilized by the CPU 101 as its work area. An image reproduction circuit 103, which includes a frame memory, generates display data to be displayed at a display device 104. The display device 104 may be, for instance, a liquid crystal display monitor. At the display device 104, images constituted of display data stored in the frame memory and text information such as menus are reproduced and displayed by the image reproduction circuit 103.

A range finding device 110 detects the adjustment state of the focal point position achieved through the photographic lens 20 and outputs a detection signal to the CPU 101. A lens drive device 111 drives a focus lens (not shown) included in the photographic lens 20 forward/backward along the optical axis in response to a command from the CPU 101 so as to adjust the focal point position of the photographic lens 20. The detection signal indicating the focal point adjustment state is used as distance information indicating the distance to the main subject.

An operating member 105, which includes a mode selector switch and a flash unit on/off switch (not shown), outputs an operation signal corresponding to a specific setting operation to the CPU 101. Based upon the operation signal input from the operating member 105, the CPU 101 executes setting change processing. The mode selector switch outputs an operation signal in response to which the electronic camera is switched to, for instance, a photographing mode, a reproduction mode or a setup mode. The photographing mode is an operation mode in which an image is photographed as the shutter release button (not shown) is pressed down, the reproduction mode is an operation mode in which an image constituted of image data recorded in the recording medium 124 is reproduced and displayed at the display device 104 and the setup mode is an operation mode selected to perform menu operations or the like.

The electronic flash unit on/off switch outputs an operation signal indicating that light emission from the electronic flash unit 112 is to be allowed/disallowed.

Upon receiving a light emission instruction from the CPU 101 in a light emission allowed state, the electronic flash unit 112 emits supplementary photographing light and illuminates the main subject. More specifically, in response to the light emission instruction issued by the CPU 101, it releases an electrical charge stored in the main capacitor thereof (not shown) into a discharge tube 112a constituted with a xenon tube or the like, thereby inducing a flash light emission at the xenon tube 112a.

The present invention relates to a specific correction of the "red eye phenomenon" manifesting in an image photographed with the electronic camera described above. The electronic camera achieved in the embodiment executes the red eye phenomenon correction on a photographed image under the following two sets of circumstances (1) on a photographed image prior to being recorded into the recording medium 124 in the photographing mode (2) on an image read from the recording medium 124 in the reproduction mode —Photographing Mode—

Figure 2:
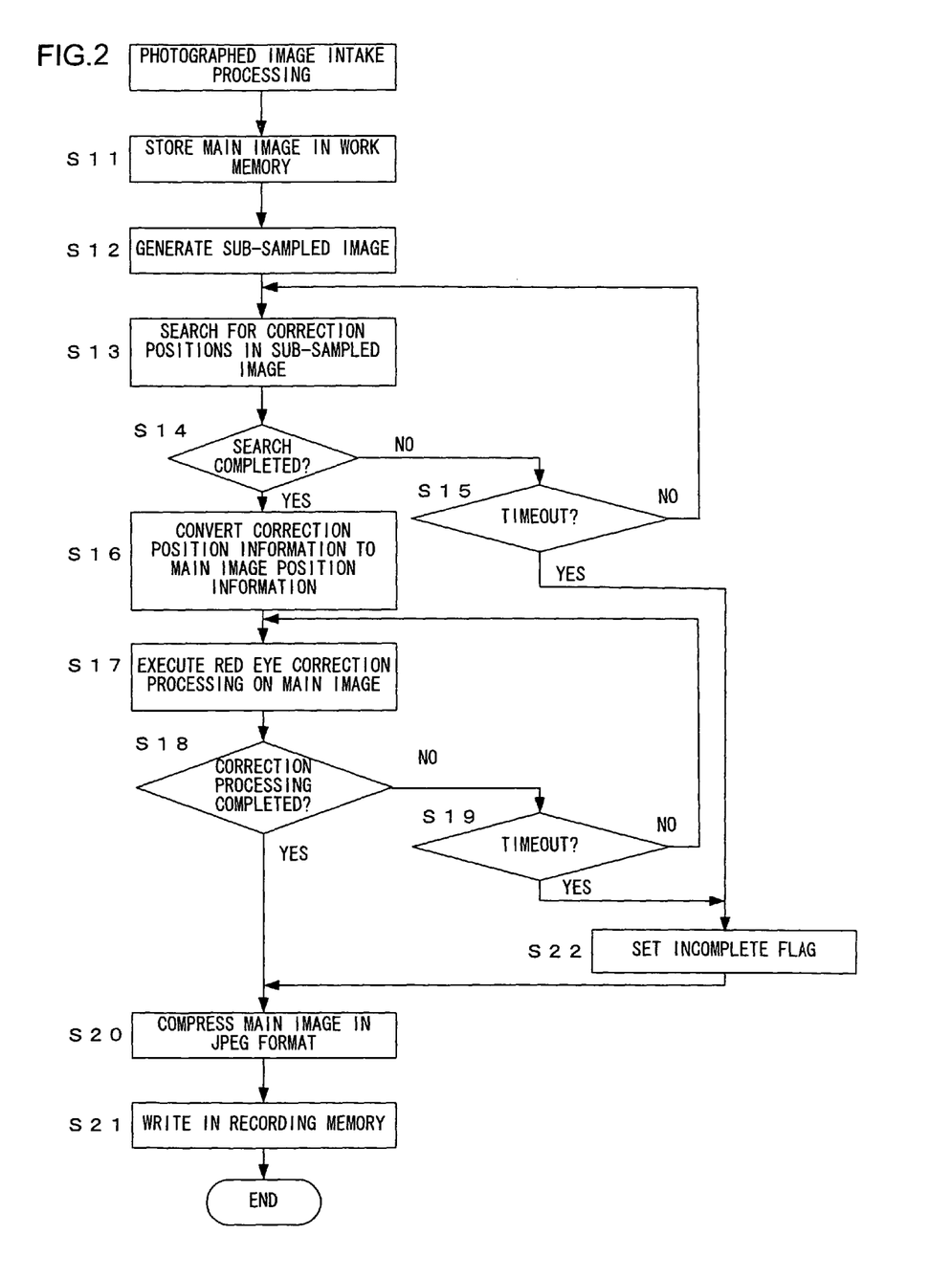
FIG. 2 presents a flowchart of the processing executed by the CPU during the red eye correction processing in the photographing mode.

The red eye correction processing executed in the photographing mode in case (1) above is now explained in reference to the flowchart (FIG. 2) of the processing executed by the CPU 101 of the electronic camera. The program in conformance to which the processing in FIG. 2 is executed is started up as the electronic camera set to execute the red eye correction processing photographs an image by emitting flash light with the electronic flash unit 112 and the digital image data are stored into the buffer memory 123. It is to be noted that the setting for the red eye correction processing is preselected through a menu operation performed in the setup mode described above in the electronic camera.

In step S11 in FIG. 2, the CPU 101 reads out the image data having been stored in the buffer memory 123 and writes the image data thus read out in the work memory 102, before the operation proceeds to step S12. The image written in the memory 102 at this time has a data size (e.g., 2592 dots×1944 dots) having been set in the electronic camera for the photographing operation, and such an image is referred to as a main image in this document.

In step S12, the CPU 101 generates a reduced image having a smaller data size (e.g., 1024 dots×768 dots) compared to the main image and stores the reduced image into the memory 102, before proceeding to step S13. The reduced image thus stored into the memory is referred to as a sub image in this document. The sub image is generated through sub-sampling processing or cull processing combined with interpolation processing, instead of the so-called simple sub-sampling processing, so as to ensure that the color component information indicating the "red eye" portions in the main image does not become culled through the reduction processing. It is to be noted that if the data size of the main image is smaller than 1024 dots×768 dots, the main image should be utilized directly as the sub image.

In step S13, the CPU 101 starts a search for correction positions (positions at which the "red eye" portions are present in the sub image) by using the sub image (sub-sampled image), and then the operation proceeds to step S14. The search for the correction positions is achieved by extracting the "red eye" portions contained in the sub image, for which the technology disclosed in Japanese Laid Open Patent Publication No. H 6-350914, for instance, may be adopted.

In step S14, the CPU 101 makes a decision as to whether or not the search has ended. The CPU 101 proceeds to step S16 upon making an affirmative decision in step S14 if the "red eye" position search has been completed, whereas it makes a negative decision in step S14 if the "red eye" position search has not been completed yet, to proceed to step S15.

In step S15, the CPU 101 makes a decision as to whether or not a timeout has occurred. The CPU 101 makes an affirmative decision in step S15 if a predetermined length of time (e.g., 3 sec) has elapsed since the search start and, in this case, the CPU 101 interrupts the search processing and proceeds to step S22. If, on the other hand, 3 seconds have not elapsed since the search start, the CPU 101 makes a negative decision in step S15 and returns to step S13. In such a case, the "red eye" position search processing is continuously executed.

In step S16, the CPU 101 converts position information (correction position information) indicating the "red eye" portions in the sub image extracted through the "red eye" position search processing to position information on the main image, before proceeding to step S17. More specifically, it obtains through calculation coordinate information indicating the coordinates corresponding to the "red eyes" in the main image by using the coordinate information indicating the coordinates corresponding to the "red eyes" in the sub image. In other words, it obtains address information indicating the addresses at which the data corresponding to the "red eyes" are stored in the address space in the memory 102 in which the main image is written.

After starting the red eye correction processing on the main image in step S17, the CPU 101 proceeds to step S18. The red eye correction processing is executed on the data corresponding to the addresses ascertained as explained above in the main image written in the memory 102. In the red eye correction, the color of the "red eyes" having been extracted is converted to the normal pupil color by, for instance, adopting the technology disclosed in Japanese Laid Open Patent Publication No. H 6-350914.

In step S18, the CPU 101 makes a decision as to whether or not the correction has ended. The CPU 101 makes an affirmative decision in step S18 if the red eye correction has been completed to proceed to step S20, whereas it makes a negative decision in step S18 if the red eye correction has not been completed to proceed to step S19.

In step S19, the CPU 101 makes a decision as to whether or not a timeout has occurred. The CPU 101 makes an affirmative decision in step S19 if a predetermined length of time (e.g., 3 sec) has elapsed since the correction start and, in this case, the CPU 101 interrupts the red eye correction processing and proceeds to step S22. If, on the other hand, 3 seconds have not elapsed since the correction start, the CPU 101 makes a negative decision in step S19 and returns to step S13. In such a case, the "red eye" correction processing is continuously executed.

In step S22, the CPU 101 sets up a red eye correction incomplete flag before proceeding to step S20. The red eye correction incomplete flag indicates that the search processing executed to locate the "red eye" positions or the red eye correction processing has not been completed yet.

In step S20, the CPU 101 executes processing for compressing the main image data to data in the JPEG format, and then the operation proceeds to step S21. In step S21, the CPU 101 generates a data file containing the main image data having undergone the compression processing, records the data file thus generated into the recording medium 124 and then ends the processing in FIG. 2. It is to be noted that if the red eye correction processing has been completed, the CPU 101 includes information needed to restore the main image having undergone the red eye correction processing to the pre-red-eye-correction main image (e.g., correction position information indicating the correction positions in the main image and the details of the correction achieved through the red eye correction processing) in the data file recorded into the recording medium 124. In addition, if the red eye correction incomplete flag is set, the CPU 101 includes information indicating that the red eye correction incomplete flag is set in the data file recorded into the recording medium 124.

—Reproduction Mode—

Figure 3:
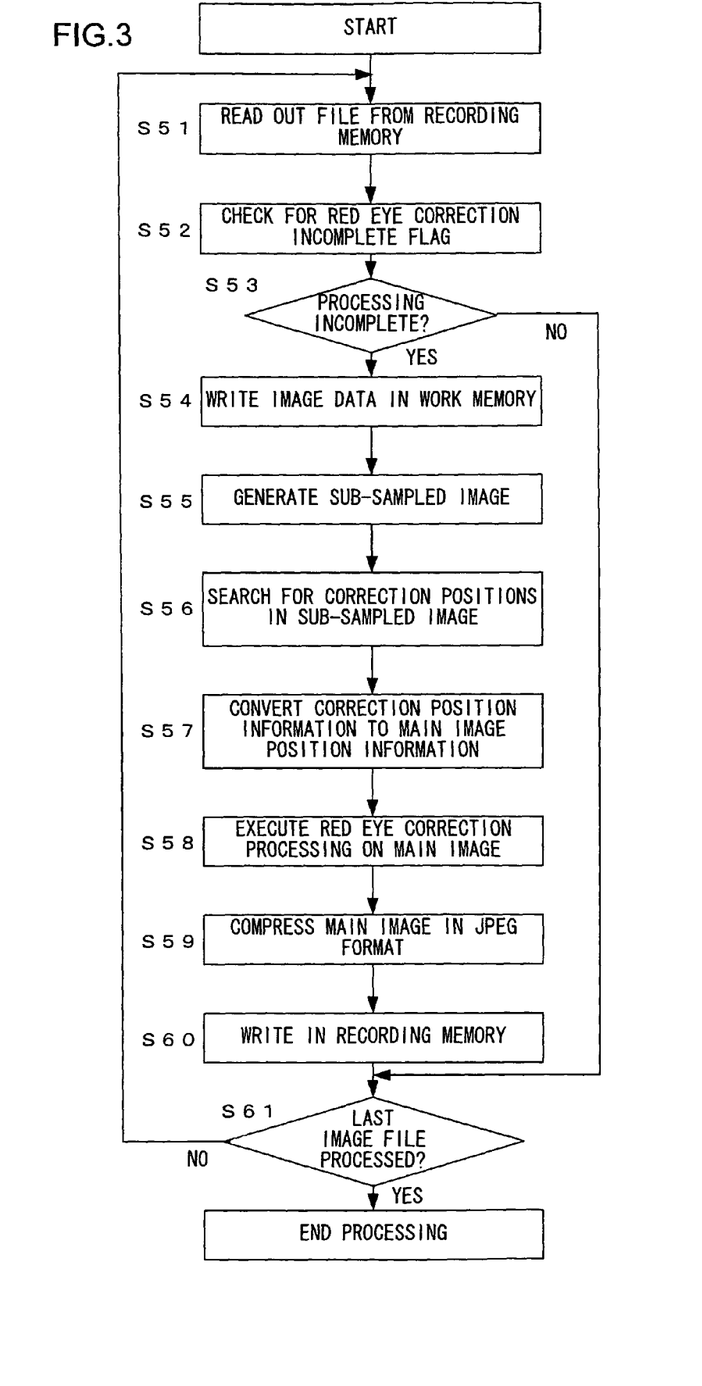
FIG. 3 presents a flowchart of the processing executed by the CPU during the red eye correction processing in the reproduction mode.

The red eye correction processing executed in the reproduction mode in case (2) above is now explained in reference to the flowchart (FIG. 3) of the processing executed by the CPU 101 of the electronic camera. The program in conformance to which the processing in FIG. 3 is executed is started up as the electronic camera set to execute the red eye correction processing is switched to the reproduction mode. It is to be noted that the setting for the red eye correction processing is preselected through a menu operation performed in the setup mode described above in the electronic camera.

In step S51 in FIG. 3, the CPU 101 reads out one of the data files recorded in the recording medium 124 and then the operation proceeds to step S52. Files are read out sequentially in, for instance, chronological order, with the data file having the oldest generation date/time read out first. In step S52, the CPU 101 checks the data file in order to ascertain whether or not the red eye correction incomplete flag is set, and then the operation proceeds to step S53. In step S53, the CPU 101 makes a decision as to whether or not the red eye correction processing is incomplete. The CPU 101 makes an affirmative decision in step S53 if the red eye correction incomplete flag is set, before proceeding to step S54. The operation proceeds to step S54 if the red eye correction processing needs to be executed. If, on the other hand, the presence of the red eye correction incomplete flag has been recognized, the CPU 101 makes a negative decision in step S53 and proceeds to step S61. The operation proceeds to step S61 to read out the next data file.

In step S54, the CPU 101 reads out the image data recorded in the data file, writes the mage data in the work memory 102 and then proceeds to step S55. The image data first undergo decompression processing if they have been compressed and are then written, whereas uncompressed image data are directly written. The image written in the memory 102 has the image data size (e.g., 2592 dots×1944 dots) having been set in the electronic camera when the image was photographed, and this image is referred to as the main image.

In step S55, the CPU 101 generates a reduced image having a smaller data size (e.g., 1024 dots×768 dots) compared to the main image and stores the reduced image into the memory 102, before proceeding to step S56. The reduced image thus stored into the memory is referred to as a sub image in this document. The sub image is generated through sub-sampling processing or cull processing combined with interpolation processing, as in the photographing mode. If the data size of the main image is smaller than 1024 dots×768 dots, the main image should be utilized directly as the sub image, as in the photographing mode.

In step S56, the CPU 101 starts a search for correction positions (positions at which the "red eye" portions are present in the sub image) by using the sub image (sub-sampled image), and then the operation proceeds to step S57. It is to be noted that timeout processing is not executed in the reproduction mode.

In step S57, the CPU 101 converts position information (correction position information) indicating the "red eye" portions in the sub image extracted through the "red eye" position search processing to position information on the main image, before proceeding to step S58. As in the photographing mode, the processing in step S57 is executed in order to utilize the coordinate information indicating the coordinates corresponding to the "red eyes" detected in the sub image in conjunction with the main image.

In step S58, the CPU 101 executes the red eye correction processing on the main image and then the operation proceeds to step S59. It is to be noted that timeout processing is not executed in the reproduction mode.

In step S59, the CPU 101 executes processing for compressing the main image data having undergone the red eye correction processing to data in the JPEG format before proceeding to step S60. It is to be noted that if the pre-red-eye-correction main image data had not been compressed, the compression processing is skipped. In step S60, the CPU 101 generates a data file containing the main image data and records the data file into the recording medium 124 through an overwrite before proceeding to step S61. The CPU 101 includes information needed to restore the main image having undergone the red eye correction processing to the pre-red eye correction main image (e.g., correction position information indicating the correction positions in the main image and details of the correction achieved through the red eye correction processing) in the data file and deletes the information indicating that the red eye correction incomplete flag is set before recording the data file into the recording medium 124.

In step S61, the CPU 101 makes a decision as to whether or not the last image file has been processed. If no more image data files are recorded in the recording medium 124, the CPU 101 makes an affirmative decision in step S61 and ends the processing in FIG. 3. If another image data file is recorded in the recording medium 124, the CPU 101 makes a negative decision in step S61 and returns to step S51. Then, similar processing is executed on the other image data file.

The electronic camera achieved in the embodiment described above is now summarized.

(1) As an image is photographed by emitting flash light with the electronic flash unit 112 in the photographing mode, the electronic camera set for the red eye correction processing executes the red eye correction processing before the data file containing the image is recorded into the recording medium 124. Since it is not necessary to record two files, i.e., the pre-red-eye-correction processing data file and the post-red-eye-correction processing data file, into the recording medium 124, a greater number of images can be recorded in the recording medium 124 compared to the number of images that can be recorded when both files need to be recorded. In addition, the length of time required to record the images into the recording medium 124 can be reduced. Furthermore, since the red eye correction is executed on the photographed image, the electronic flash unit 112 does not need to execute the preliminary light emission during the photographing operation in order to reduce the extent of the red eye phenomenon. Thus, the photographing operation can be executed faster compared to a photographing operation during which the preliminary light emission needs to be executed, and since no preliminary light emission needs to be executed, the power consumption can be kept down.

(2) During the red eye correction processing, the "red eye" portions are searched (S13) by using the sub image with a smaller data size than the main image, position information indicating the positions corresponding to the "red eyes" in the main image is obtained through calculation based upon the position information obtained through the search (step S16), and the correction processing is executed on the portion of the main image data corresponding to the calculated position information (S17). As a result, the length of time required to execute the search can be greatly reduced compared to the length of time required to search for the "red eye" portions by using the main image data. For instance, when the data size of the main image is 2592 dots×1944 dots and the data size of the sub image is 1024 dots×768 dots, far fewer dots need to be searched and thus, the length of search time can be reduced to approximately ⅙. In addition, unlike in the related art (Patent Reference Literature 2), it is not necessary to photograph two images and consequently, the capacity of the memory used by the CPU to execute the arithmetic operations does not need to be large and the length of time required for the photographing operation, too, can be reduced.

(3) A decision is made as to whether or not a timeout has occurred (step S15, step S19), and if the red eye correction processing (including the red eye portion search) needs to be executed longer than the predetermined length of time, the processing is interrupted. As a result, since protracted red eye correction processing does not delay the photographing operation for the next frame, a good photo opportunity is not missed.

(4) If the red eye correction processing is interrupted, information indicating that the red eye correction processing is incomplete is included in the data file of the image, and thus, data files having images recorded without completing the red eye correction can be easily searched.

(5) In the reproduction mode, the electronic camera set for the red eye correction processing sequentially executes red eye correction processing on data files having recorded therein the information indicating that the red eye correction processing is incomplete. Thus, the user does not need to indicate to the electronic camera whether or not each data file needs to undergo the red eye correction processing. Since the electronic camera automatically executes the red eye correction processing on images that need to undergo the red eye correction among the data files recorded in the recording medium 124, the operability of the electronic camera is improved.

(6) In the reproduction mode, no timeout decision-making is executed, and, as a result, the red eye correction processing (including the red eye portion search) in the reproduction mode is executed with a high degree of reliability.

While the image data stored in the buffer memory 123 are written over in the work memory 102 in the explanation given above, a common memory may be used to constitute the buffer memory 123 and the work memory 102.

The sub image used to detect the "red eye" portions may be generated by using the main image before undergoing white balance adjustment processing or the main image having undergone white balance adjustment processing.

It is desirable that information indicating that the red eye correction processing is currently in progress be displayed at the display device 104 during the red eye correction processing (including the red eye portion search), i.e., after the processing in step S11 starts until the processing in step S20 starts. The information indicating that the red eye correction processing is currently in progress may be, for instance, an icon of an "eye" displayed over the freeze image.

While the processing in FIG. 3 starts as the electronic camera set for the red eye correction processing is switched to the reproduction mode, it may also start when the main switch of the electronic camera set in the reproduction mode is turned on and when the recording medium 124 is loaded into the electronic camera set in the reproduction mode.

The data size of the sub image does not need to be 1024 dots×768 dots, and an optimal size setting may be selected in correspondence to the processing speed of the CPU 101 and the data size of the main image.

The data size of the sub image may be adjusted in correspondence to the photographing conditions, as well. For instance, the data size of the sub image may be adjusted in correspondence to the distance to the main subject. The data size should be set to a larger value when the subject distance is significant since the face (particularly the eyes) of the main subject photographed in the image tends to range over a small area, whereas the data size should be set to a smaller value when the subject distance is small since the face of the main subject photographed in the image tends to range over a large area. The detection signal provided by the range finding device 112 is used as the distance information indicating the distance to the main subject.

In addition, the data size of the sub image may be adjusted in correspondence to the focal length of the photographic lens. The data size should be set to a larger value when the focal length is small since the face (particularly the eyes) of the main subject photographed in the image tends to range over a small area, whereas the data size should be set to a smaller value when the focal length is great since the face of the main subject photographed in the image tends to range over a large area. The lens position detection signal provided by the lens drive device 111 or the like is used as the focal length information.

Furthermore, the data size of the sub image may be adjusted in correspondence to the specific photographing mode (e.g., a scene assist mode) set for the camera. The data size of the sub image should be reduced for a portrait photographing operation since the face of a single subject photographed in the image ranges over a large area. The data size of the sub image should be increased for a group picture in which the face of each subject photographed in the image ranges over a small area.

While the timeout processing is individually executed after starting the red eye portion search processing (step S13) and after starting the red eye correction processing (step S17), it may be executed after starting the position information conversion processing (step S16), as well. By executing the timeout processing individually after starting the various types of processing, it is possible to interrupt the processing if execution of the red eye portion search, the sub image-to-main image position information conversion or the red eye correction processing goes on longer than the predetermined length of time. It is to be noted that a value other than 3 sec may be selected as appropriate for the predetermined length of time used in the timeout decision-making.

A red eye correction processing program in conformance to which the processing in FIG. 3 is executed may be prepared and the program may be taken into a personal computer or the like which is then enabled to function as a red eye image correction device. In such a case, the program should be loaded into a data storage device of the personal computer and the personal computer executing the loaded program functions as the red eye image correction device. The program may be loaded by loading a recording medium having stored therein the program in the personal computer or via a network.

Figure 4:
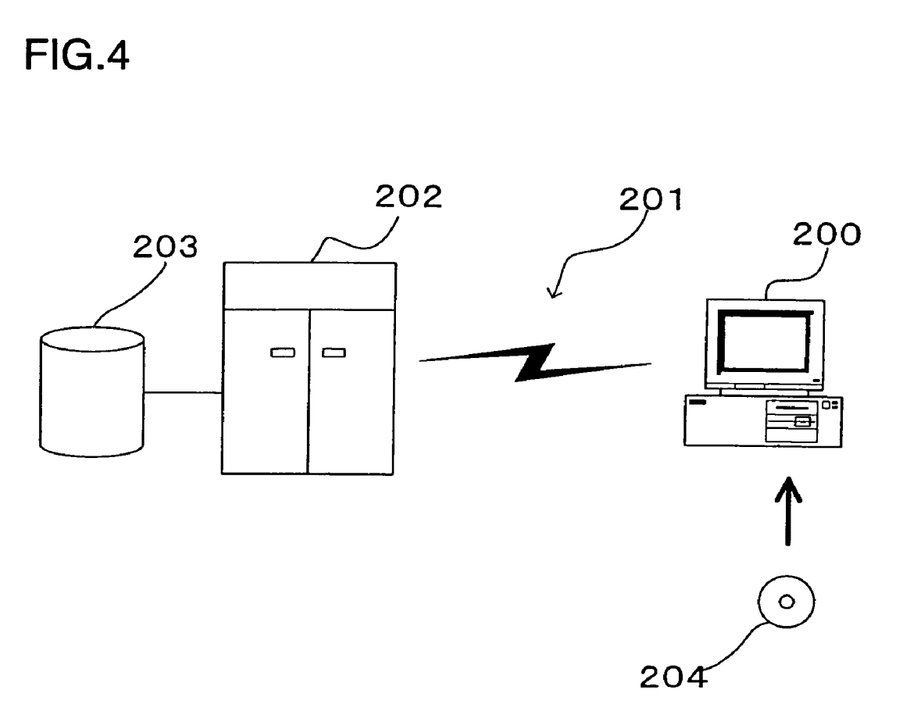
FIG. 4 shows how the program may be provided to a personal computer.

FIG. 4 shows how the program may be provided to a personal computer. A personal computer 200 obtains the program via a CD-ROM 204. The personal computer 200 can also be connected with a communication line 201. A computer 202 is a server computer that provides the program stored in a recording medium such as a hard disk 203. The communication line 201 may be a communication line for Internet communication, personal computer communication or the like, or it may be a dedicated communication line. The computer 202 reads out the program stored in the hard disk 203 and transmits the program thus read out to the personal computer 200 via the communication line 201. Namely, the program embodied as a data signal on a carrier wave is transmitted via the communication line 201. In short, the program can be distributed as a computer-readable computer program product adopting any of various modes such as a recording medium and a carrier wave.

The above described embodiment is an example, and various modifications can be made without departing from the spirit and scope of the invention.

What is claimed is:

1. A red eye image correction device, comprising:
   a data size conversion unit that executes reduction processing on an image so as to retain color component information contained in the image and generates a sub image with a smaller data size than the image;
   a red eye detection unit that detects data corresponding to red eye portions in data constituting the sub image;
   a position information calculation unit that obtains through calculation second position information indicating positions of data corresponding to the red eye portions in data constituting the image by using first position information indicating positions of the detected data in the sub image data; and
   a red eye correction unit that executes red eye correction processing on the data of the image indicated by the second position information, wherein
   the data size conversion unit adjusts a data size of the sub image in correspondence to photographing conditions.

2. A red eye image correction device according to claim 1, wherein:
   the data size conversion unit generates the sub image if the data size of the image is equal to or greater than a predetermined value.

3. A red eye image correction device according to claim 1, further comprising:
   a process regulating unit that interrupts detection processing by the red eye detection unit, calculation processing by the position information calculation unit or the red eye correction processing by the red eye correction unit if the processing has been executed over a length of time exceeding a predetermined time length and proceeds to execute processing other than the detection processing, the calculation processing and the red eye correction processing.

4. A red eye image correction device according to claim 3, further comprising:
   a data recording unit that records data indicating incomplete red eye correction in correlation with the data of the image if the processing is interrupted by the process regulating unit.

5. A red eye image correction device according to claim 4, wherein:
   the data size conversion unit generates the sub image in correspondence to an image correlated with the data indicating incomplete red eye correction.

6. An electronic camera, comprising:
   a red eye image correction device according to claim 1;
   an image-capturing unit that captures a subject image and generates image data that include a color component;
   a light emission instruction unit that outputs a light emission instruction signal to an electronic flash unit which illuminates a subject during a photographing operation; and
   a recording unit that records the data constituting the image into a recording medium.

7. A red eye image correction device according to claim 2, further comprising:
   a process regulating unit that interrupts detection processing by the red eye detection unit, calculation processing by the position information calculation unit or the red eye correction processing by the red eye correction unit if the processing has been executed over a length of time exceeding a predetermined time length and proceeds to execute processing other than the detection processing, the calculation processing and the red eye correction processing.

8. A red eye image correction device according to claim 1, wherein:
   the data size conversion unit adjusts the data size of the sub image so that the data size of the sub image is set to a larger value when a subject distance is significant as compared with that the data size of the sub image is set to a smaller value when the subject distance is small.

9. A red eye image correction device according to claim 1, wherein:
   the data size conversion unit adjusts the data size of the sub image so that the data size of the sub image is set to a larger value when a focal length of a photographic lens is small as compared with that the data size of the sub image is set to a smaller value when the focal length is great.

10. An electronic camera, comprising:
    an image-capturing unit that captures a subject image and generates image data;
    a sub image generation unit that executes reduction processing on the image data to generate a sub image data with a smaller data size than the image data;
    a red eye detection unit that executes detection processing to detect red eye portions in the sub image data;
    a position information calculation unit that executes calculation processing to obtain second position information indicating positions of red eye portions in the image data by using first position information indicating positions of the detected red eye portions in the sub image data;
    a red eye correction unit that executes red eye correction processing on the image data based upon the second position information;
    a recording unit that records the image data having undergone the red eye correction processing into a recording medium,
    an image obtaining unit that obtains the image data recorded in the recording medium; and
    a control unit that controls the reduction processing by the sub image generation unit, the detection processing by the red eye detection unit, the calculation processing by the position information calculation unit and the red eye correction processing by the red eye correction unit to be executed on the obtained image, when the obtained image data includes the information indicating that the red eye correction processing has not undergone,
    wherein if at least one of the detection processing by the red eye detection unit, the calculation processing by the position information calculation unit and the red eye correction processing by the red eye correction unit has been executed over a length of time exceeding a predetermined time length, the red eye correction unit does not execute the red eye correction processing on the image data; and
    the recording unit records the image data having not undergone the red eye correction processing with information indicating that the red eye correction processing has not undergone, into the recording medium, and
    in case that the image obtaining unit obtains the image data recorded in the recording medium and the red eye correction processing is to be executed on the obtained image, even if at least one of the detection processing by the red eye detection unit, the calculation processing by the position information calculation unit and the red eye correction processing by the red eye correction unit has been executed over a length of time exceeding the predetermined time length, the red eye correction unit does execute the red eye correction processing on the image data.

11. An electronic camera according to claim 10, wherein:

the recording unit records the obtained image data having undergone the red eye correction processing into the recording medium.

12. A computer readable non-transitory storage medium that stores a computer-executable program for correcting a red eye image, the program comprising storage medium that stores a computer-executable program for correcting a red eye image, the program comprising:

instructions for executing reduction processing on an image so as to retain color component information contained in the image and generating a sub image with a smaller data size than the image;

instructions for detecting data corresponding to red eye portions in data constituting the sub image;

instructions for obtaining through calculation second position information indicating positions of data corresponding to the red eye portions in data constituting the image by using first position information indicating positions of the detected data in the sub image data; and instructions for executing red eye correction on the data of the image indicated by the second position information, wherein the instructions for executing reduction processing further comprises instructions for adjusting a data size of the sub image in correspondence to photographing conditions.

* * * * *